United States Patent
Lemma et al.

(10) Patent No.: US 7,546,467 B2
(45) Date of Patent: Jun. 9, 2009

(54) TIME DOMAIN WATERMARKING OF MULTIMEDIA SIGNALS

(75) Inventors: Aweke Negash Lemma, Eindhoven (NL); Javier Francisco Aprea, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 969 days.

(21) Appl. No.: 10/509,548

(22) PCT Filed: Feb. 26, 2003

(86) PCT No.: PCT/IB03/00785

§ 371 (c)(1),
(2), (4) Date: Sep. 23, 2004

(87) PCT Pub. No.: WO03/083858

PCT Pub. Date: Oct. 9, 2003

(65) Prior Publication Data

US 2005/0152549 A1     Jul. 14, 2005

(30) Foreign Application Priority Data

Mar. 28, 2002 (EP) .................................. 02076205

(51) Int. Cl.
*H04L 9/00* (2006.01)
(52) U.S. Cl. ..................................................... 713/176
(58) Field of Classification Search ................... 713/176
See application file for complete search history.

(56) References Cited

U.S. PATENT DOCUMENTS

| 5,401,897 A | * | 3/1995 | Depalle et al. | ................. 84/625 |
| 6,209,094 B1 | * | 3/2001 | Levine et al. | ................ 713/176 |
| 2002/0078359 A1 | * | 6/2002 | Seok et al. | ................... 713/176 |

FOREIGN PATENT DOCUMENTS

WO     WO0000969 A1     1/2000

OTHER PUBLICATIONS

Van Der Veen et al, "Robust, Multi-Functional and High-Quality Audio Watermarking Technology", vol. 110, No. 5345, May 12, 2001, pp. 1-9.

Aweke Negash Lemma, et al, "A Temporal Domain Audio Watermarking Technique", IEEE Transactions on Signal Processing, Apr. 2003, vol. 51, No. 4, pp. 1088-1097.

Zwicker et al, "Audio Engineering and Psychoacoustics: Matching Signals to the Final Receiver, the Human Auditory System", Journal of the Audio Engineering Society, Mar. 1991, vol. 39, pp. 115-126.

* cited by examiner

*Primary Examiner*—Gilberto Barron, Jr.
*Assistant Examiner*—Samson B Lemma
(74) *Attorney, Agent, or Firm*—Larry Liberchuk

(57) ABSTRACT

A method of generating a watermark signal, embedding the watermark signal within a multimedia signal, and subsequently detecting the watermark signal is described. The watermark signal is the sum of two sequences of values, the second sequence of values being a circularly shifted version of the first sequence.

19 Claims, 10 Drawing Sheets

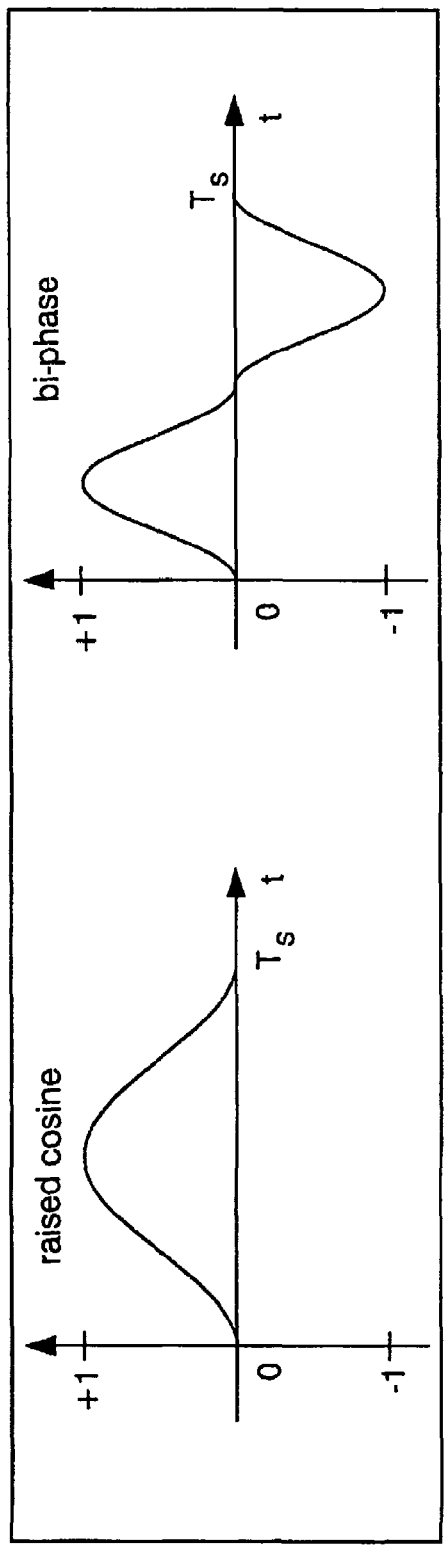

TIME DOMAIN WATERMARKING OF MULTIMEDIA SIGNALS

This application is a national Stage entry of International Application No. PCT/IB03/00785.

The present invention relates to apparatus and methods for encoding and decoding information in multimedia signals, such as audio, video or data signals.

Watermarking of multimedia signals is a technique for the transmission of additional data along with the multimedia signal. For instance, watermarking techniques can be used to embed copyright and copy control information into audio signals.

The main requirement of a watermarking scheme is that it is not observable (i.e. in the case of an audio signal, it is inaudible) whilst being robust to attacks to remove the watermark from the signal (e.g. removing the watermark will damage the signal). It will be appreciated that the robustness of a watermark will normally be a trade off against the quality of the signal in which the watermark is embedded. For instance, if a watermark is strongly embedded into an audio signal (and is thus difficult to remove) then it is likely that the quality of the audio signal will be reduced.

Various types of audio watermarking schemes have been proposed, each with its own advantages and disadvantages. For instance, one type of audio watermarking scheme is to use temporal correlation techniques to embed the desired data (e.g. copyright information) into the audio signal. This technique is effectively an echo-hiding algorithm, in which the strength of the echo is determined by solving a quadratic equation. The quadratic equation is generated by auto-correlation values at two positions: one at delay equal to $\tau$, and one at delay equal to 0. In such a scheme, as echoes of the audio signal are added to the original audio signal, the resulting signal is in fact both an amplitude and a phase modulated version of the original audio signal. At the detector, the watermark is extracted by determining the ratio of the auto correlation function at the two delay positions.

This correlation technique has a number of drawbacks. For instance, it is only possible to embed the watermark where the resulting quadratic equation has real roots, and consequently this reduces the robustness (ability of the watermark to withstand attacks) for a given audio quality. Further, the performance of the correlation algorithm is dependent upon the value of the delay $\tau$ and the characteristics of the original signal. This is a significant drawback.

Also known are watermarking schemes based on the amplitude modulation of DFT (Discrete Fourier Transform) coefficients. As such schemes require the calculation of DFTs at both the encoder and the decoder, the resulting hardware for implementing such DFT schemes tends to be relatively complex, and hence the scheme tends to be slow to perform and costly. Further, watermarks cannot be satisfactorily embedded in audio segments that have sparse frequency characteristics, and hence the DFT scheme does not work well with particular types of music.

WO 00/00969 describes an alternative technique for embedding or encoding auxiliary signals (such as copyright information) into a multimedia host or cover signal. A replica of the cover signal, or a portion of the cover signal in a particular domain (time, frequency or space), is generated according to a stego key, which specifies modification values to the parameters of the cover signal. The replica signal is then modified by an auxiliary signal corresponding to the information to be embedded, and inserted back into the cover signal so as to form the stego signal.

At the decoder, in order to extract the original auxiliary data, a replica of the stego signal is generated in the same manner as the replica of the original cover signal, and requires the use of the same stego key. The resulting replica is then correlated with the received stego signal, so as to extract the auxiliary signal. The extraction of the auxiliary signal is thus relatively complex, and requires the stego key at both the encoder (or embedder) and decoder (or detector). Additionally, a brute force search is required to synchronize to the auxiliary signal at the detector.

Further, performance of the payload extraction is dependent on how well the auxiliary signal can be estimated. In a system with a high expected error rate of the payload bits in the auxiliary signal, this is very difficult to achieve. Solutions would lead to very complex error correction methods, or significantly limit the information capacity.

It is an object of the present invention to provide a watermarking scheme that substantially addresses at least one of the problems of the prior art.

In a first aspect, the present invention provides a method of generating a watermark signal for embedding in a multimedia signal, the method comprising the steps of: (a) generating two sequences of values, the second sequence being a circularly shifted version of the first sequence; and (b) generating a watermark signal by adding the values of the first sequence to the respective values in the corresponding positions of the second sequence.

Preferably, each value of the first and second sequences is represented by a pulse of preferable width $T_s$ so as to form rectangular wave signals.

Preferably, in step (a) a window shaping function is applied to convert each of the rectangular signals into respective smoothly varying signals, with the resulting smoothly varying signals being added in step (b) to form the watermark signal.

Preferably, each one of said sequences of values is convolved with a window shaping function which has a width of at least $T_s$, so as to generate two smoothly varying signals, these smoothly varying signals being added together in step (b) so as to form the watermark signal.

Preferably, said window shaping function has a band limited frequency behavior and a smooth temporal behavior.

Preferably, said window shaping function has a symmetric or anti-symmetric temporal behavior.

Preferably, said window shaping function comprises at least one of a raised cosine function and a bi-phase function.

Preferably, the watermark signal is generated by the addition of the two smoothly varying signals with a relative delay of $T_r$, where $T_r < T_s$.

Preferably, $T_r$ is chosen such that maximum amplitude points of the first smoothly varying signal coincide with zero-crossings of the second smoothly varying signal, and vice-versa.

Preferably, said watermark signal has a payload that is encoded in the combination of said two sequences of values.

In another aspect, the present invention provides an apparatus arranged to generate a watermark signal for embedding in a multimedia signal, the apparatus comprising: (a) a sequence generator arranged to use a first sequence of values to generate a second sequence of values, the second sequence being a circularly shifted version of the first sequence; and (b) a signal generator arranged to generate a watermark signal by adding the values of the first sequence to the respective values in the corresponding positions of the second sequence.

Preferably, the apparatus further comprises a signal conditioner arranged to convert each sequence of values into a smoothly varying signal.

Preferably, the apparatus is arranged to generate said first sequence of values by circularly shifting a primary sequence of values.

In a further aspect, the present invention provides a method of embedding a watermark in a multimedia signal, the method comprising the steps of: (a) generating a watermark signal equal to the sum of two sequences of values, the second sequence being a circularly shifted version of the first sequence of values; (b) generating a host modifying multimedia signal as a product of the watermark signal and the multimedia signal; (c) generating a watermarked multimedia signal by adding a scaled version of said host modifying multimedia signal to the multimedia signal.

Preferably, said scaled version of the host modifying signal is generated by controlling the scaling factor by a predetermined cost-function.

Preferably, said cost function comprises multiple scaling factors, each scaling factor being defined separately for one or more of the plurality of frequency bands in the multimedia signal.

Preferably, said frequency bands are determined according to a model of the human auditory and/or visual system.

Preferably, in step (b) said host modifying multimedia signal is generated by multiplying said watermark signal with an extracted portion of the multimedia signal.

Preferably, said extracted portion of the multimedia signal is obtained by filtering at least a portion of the multimedia signal with respect to at least one of frequency, space and time.

The method preferably further comprises the steps of: (d) generating a second watermark signal equal to the sum of a third and a fourth sequences of values, the fourth sequence being a circularly shifted version of the third sequence of values; (e) extracting a second portion of the multimedia signal, the second portion being filtered such that it does not overlap with said first portion; (f) generating a watermarked multimedia signal by adding the product of the second watermark signal and the second extracted portion of the multimedia signal to the watermarked multimedia signal.

In another aspect the present invention provides an apparatus arranged to embed a watermark signal in a multimedia signal, the apparatus comprising; (a) a watermark generator arranged to generate a signal equal to the sum of two sequences of values, the second sequence being a circularly shifted version of the first sequence of values; (b) an output signal generator arranged to generate a watermarked multimedia signal by adding the product of the watermark signal and the multimedia signal to the multimedia signal.

Preferably, the apparatus further comprises a signal extractor arranged to extract a first portion of the multimedia signal.

In a further aspect the present invention provides a multimedia signal comprising a watermark, wherein the original multimedia signal has been watermarked by modifying the temporal envelope of the original signal by the watermark, the watermark comprising the sum of a first and a second sequences of values, the second sequence of which is a circularly shifted version of the first sequence.

In another aspect the present invention provides a method of detecting a watermark signal embedded in a multimedia signal, the method comprising the steps of: (a) receiving a multimedia signal that may potentially be watermarked by a watermark signal modifying the temporal envelope of the host multimedia signal; (b) extracting an estimate of the watermark from said received signal; and (c) correlating the estimate of the watermark with a reference version of the watermark so as to determine whether the received signal was watermarked.

Preferably, the watermark signal has a payload, and the method further comprises the step of determining the payload of the watermark.

In a further aspect, the present invention provides a watermark detector apparatus arranged to detect whether a watermark signal is embedded within a multimedia signal, the watermark detector comprising: (a) a receiver arranged to receive a multimedia signal that may potentially be watermarked by a watermark signal modifying the temporal envelope of the host multimedia signal; (b) an extractor arranged to extract an estimate of the watermark from said received signal; and (c) a correlator arranged to correlate the estimate of the watermark with a reference version of the watermark so as to determine whether the received signal was watermarked.

Preferably, the apparatus further comprises a payload detector arranged to determine if a payload is present within said watermark and to determine the value of said payload.

For a better understanding of the invention, and to show how embodiments of the same may be carried into effect, reference will now be made, by way of example, to the accompanying diagrammatic drawings in which:

FIGS. 6a and 6b show two preferred alternative window shaping functions s(n) in the form of respectively a raised cosine function and a bi-phase function;

Figure 11:
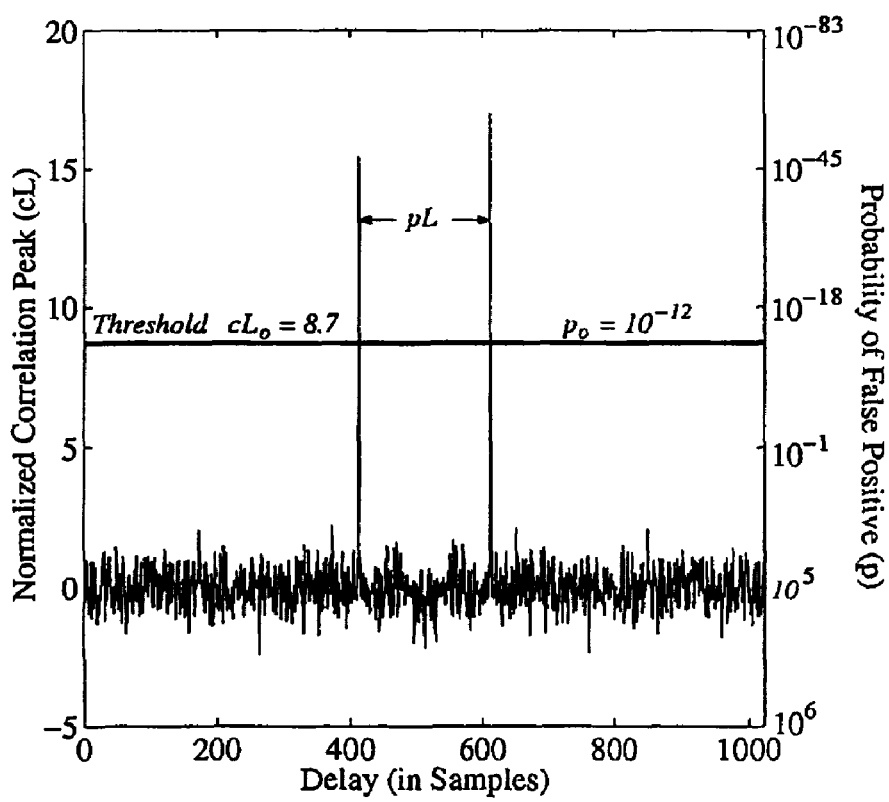
Figure 8:
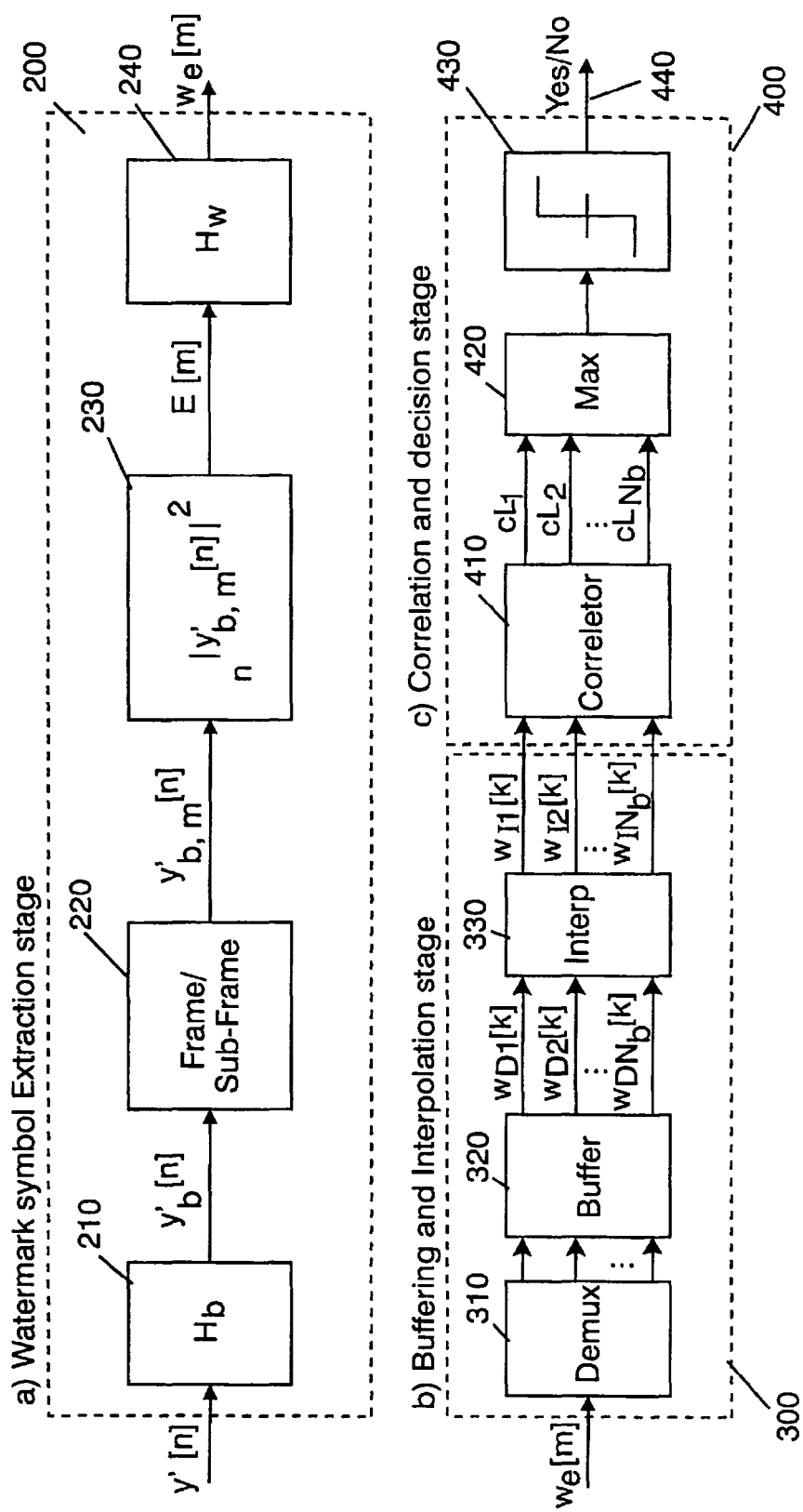
FIG. 8 is a diagram illustrating a watermark detector in accordance with an embodiment of the present invention.
Figure 9:
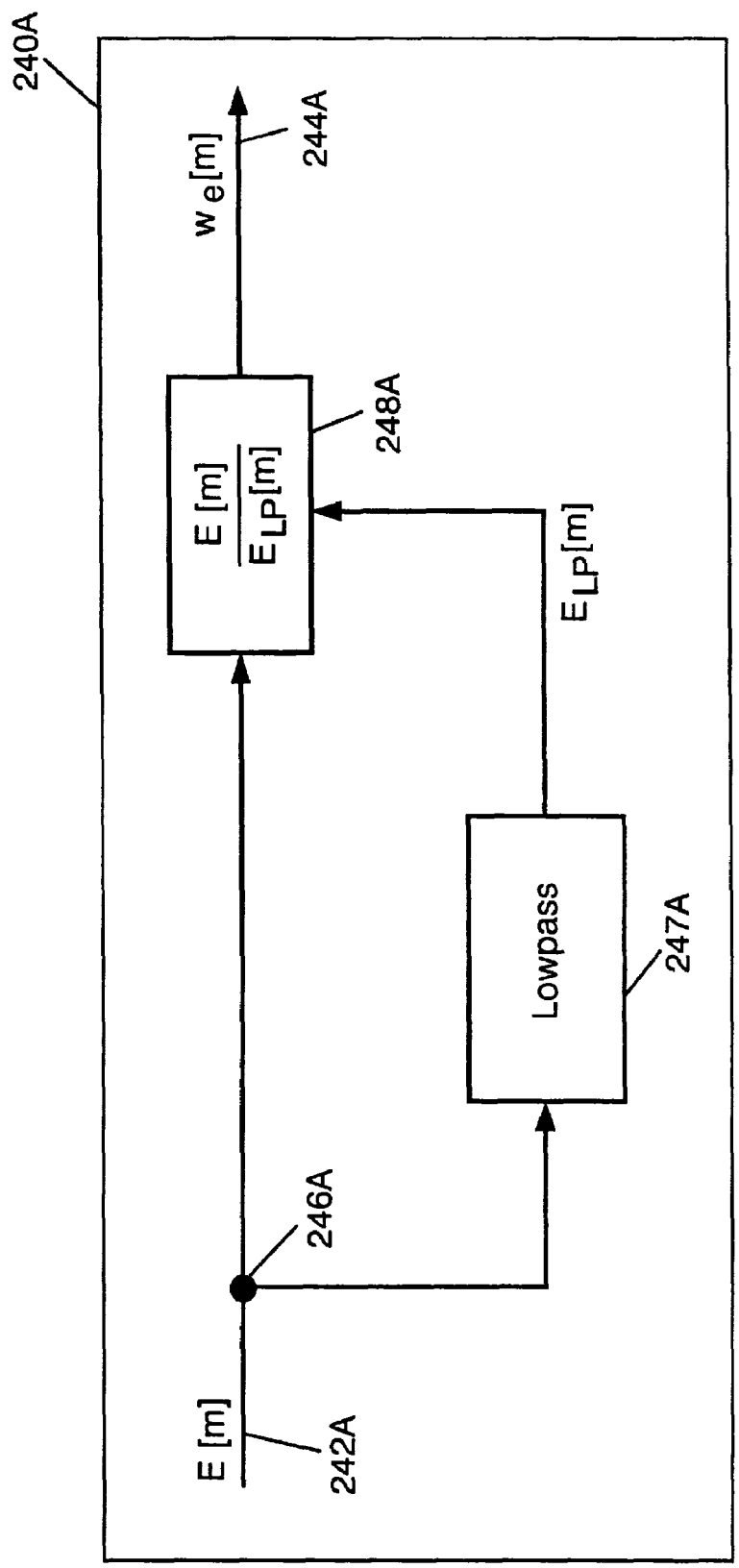
Figure 10:
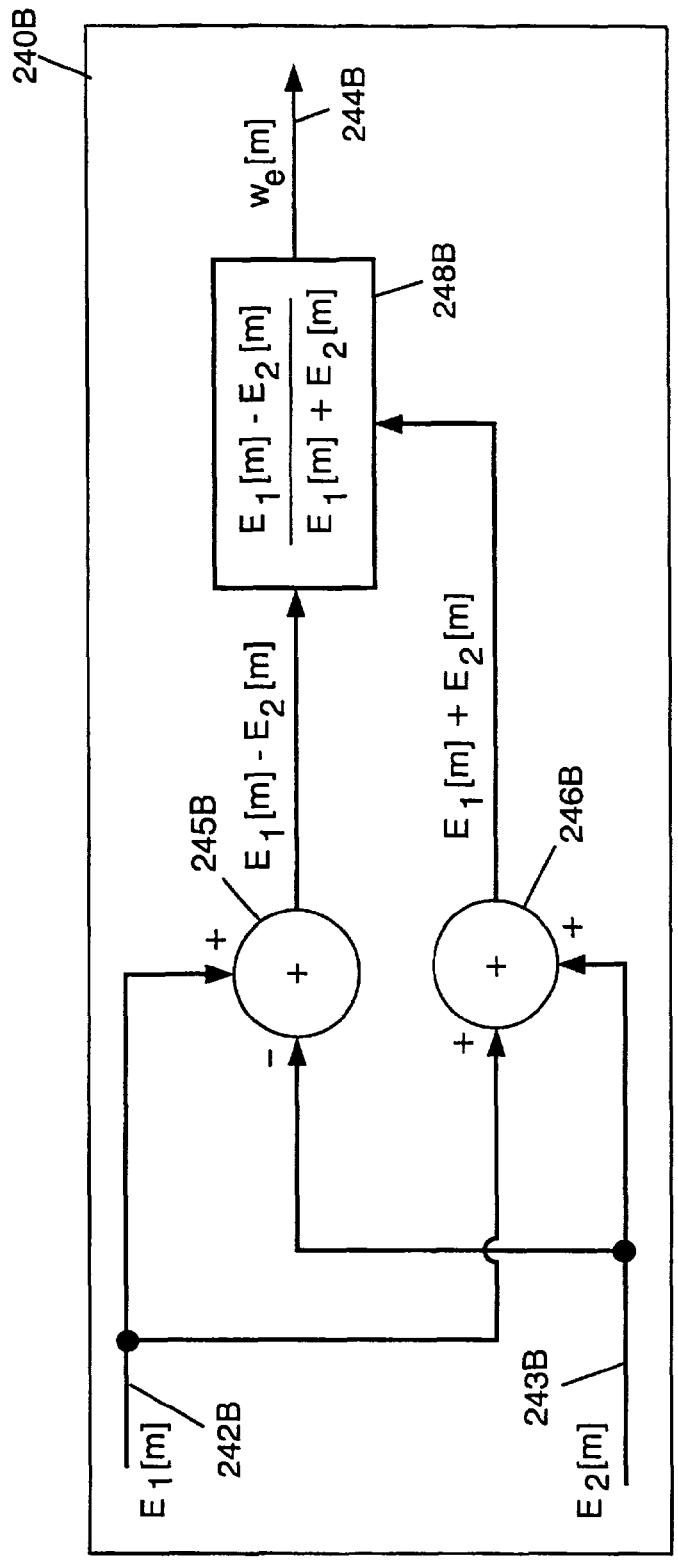

FIG. 9 diagrammatically shows the whitening filter $H_w$ of FIG. 8, for use in conjunction with a raised cosine shaping window function;

FIG. 10 diagrammatically shows the whitening filter $H_w$ of FIG. 8, for use in conjunction with a bi-phase window shaping function; and FIG. 11 shows a typical shape of the correlation function output from the correlator of the watermark detector shown in FIG. 8.

Figure 1:
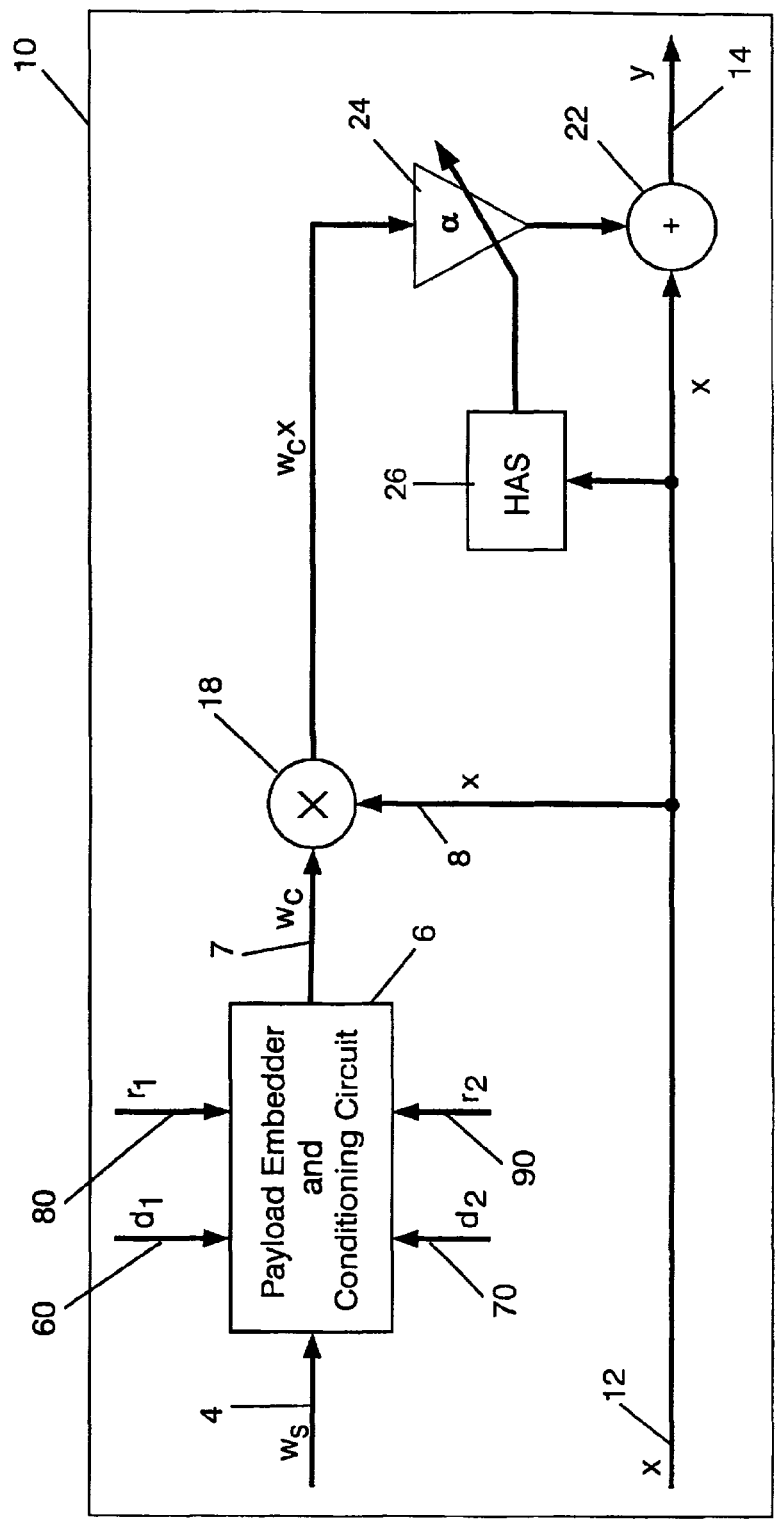
FIG. 1 is a diagram illustrating a watermark embedding apparatus in accordance with an embodiment of the present invention.

FIG. 1 shows a block diagram of the apparatus required to perform the digital signal processing for embedding a multibit payload watermark $w_c$ into a host signal x in accordance with a preferred embodiment to the present invention.

A host signal x is provided at an input 12 of the apparatus. The host signal x is passed in the direction of output 14 via the adder 22. However, a replica of the host signal x (input 8) is split off in the direction of the multiplier 18, for carrying the watermark information.

The watermark signal $w_c$ is obtained from the payload embedder and watermark conditioning apparatus 6, and derived from the watermark random sequence $w_s$ (input 4), which is input to the payload embedder and watermark conditioning apparatus. The multiplier 18 is utilized to calculate the product of the watermark signal $w_c$ and the replica audio signal x. The resulting product, $w_c x$ is then passed via a gain controller 24 to the adder 22. The gain controller 24 is used to amplify or attenuate the signal by a gain factor α.

The gain factor α controls the trade off between the audibility and the robustness of the watermark. It may be a constant, or variable in at least one of time, frequency and space. The apparatus in FIG. 1 shows that, when α is variable, it can be automatically adapted via a signal analyzing unit 26 based upon the properties of the host signal x. Preferably, the gain a is automatically adapted, so as to minimize the impact on the signal quality, according to a properly chosen perceptibility cost-function, such as a psycho-acoustic model of the human auditory system (HAS). Such a model is, for instance, described in the paper by E. Zwicker, "Audio Engineering and Psychoacoustics: Matching signals to the final receiver, the Human Auditory System", Journal of the Audio Engineering Society, Vol. 39, pp. Vol. 115-126, March 1991.

In the following, an audio watermark is utilized, by way of example only, to describe this embodiment of the present invention.

The resulting watermark audio signal y is then obtained at the output 14 of the embedding apparatus 10 by adding an appropriately scaled version of the product of $w_c$ and x to the host signal:

$$y[n]=x[n]+\alpha w_c[n]x[n]. \quad (1)$$

Preferably, the watermark $w_c$ is chosen such that when multiplied with x, it predominantly modifies the short time envelope of x.

Figure 2:
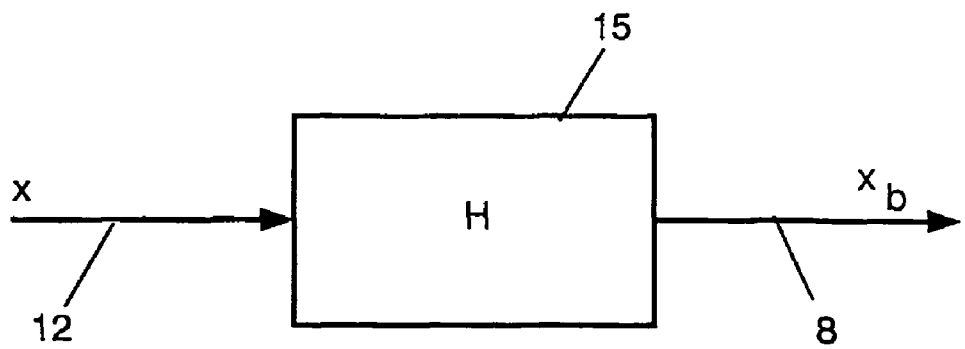
FIG. 2 shows a signal portion extraction filter H used in one preferred embodiment.

FIG. 2 shows one preferred embodiment in which the input 8 to the multiplier 18 in FIG. 1 is obtained by filtering the replica of the host signal x using a filter H in the filtering unit 15. If the filter output is denoted by $x_b$, then according to this preferred embodiment, the watermarked signal is generated by adding an appropriately scaled version of the product of $x_b$ and the watermark $w_c$ to the host signal x.

Let $\bar{x}_b$ be defined such that $\bar{x}_b = x - x_b$, and $y_b$ be defined such that $y = y_b + \bar{x}_b$, then the watermarked signal y can be written as $$y[n]=(1+w_c[n])x_b[n]+\bar{x}_b[n]. \quad (2)$$

and the envelope modulated portion $y_b$ of the watermarked signal y is given as $$y_b[n]=(1+w_c[n])x_b[n] \quad (3)$$

Figures 3A, 3B:
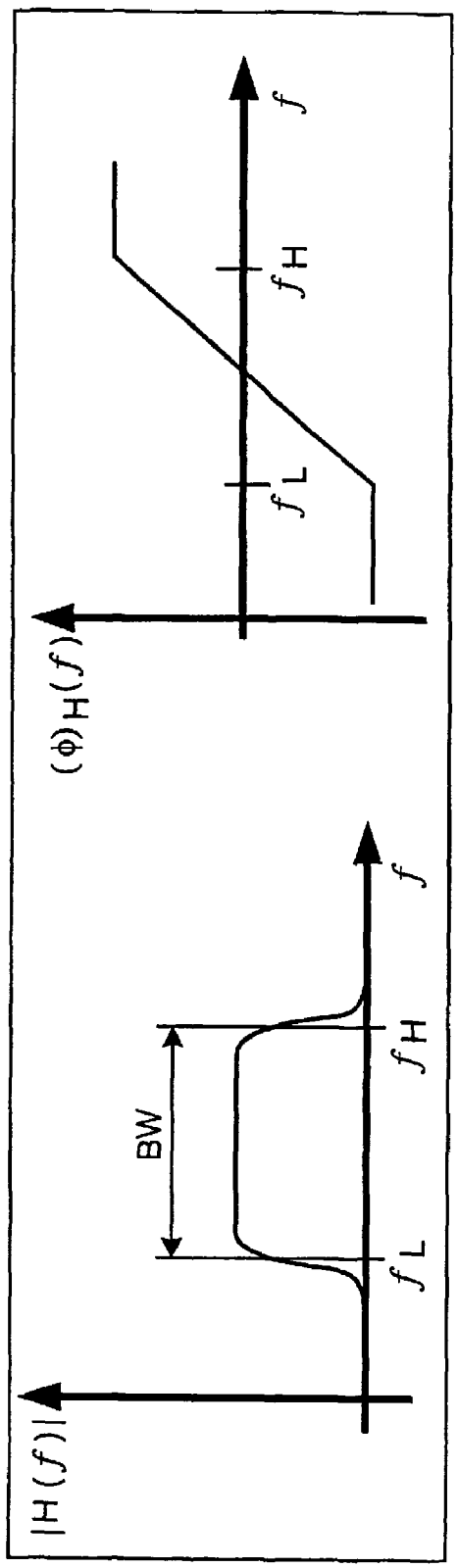
FIGS. 3a and 3b show respectively the typical amplitude and phase responses as a function of frequency of the filter H used in FIG. 2.

Preferably, as shown in FIG. 3, the filter H is a linear phase band-pass filter characterized by its lower cut off frequency $f_L$ and upper cut off frequency $f_H$. As can be seen in FIG. 3b, the filter H has a linear phase response with respect to frequency f within the pass band (BW). Thus, when H is a band-pass filter, $x_b$ and $\bar{x}_b$ are the in-band and out-of-band components of the host signal respectively. For optimum performance, it is preferable that the signals $x_b$ and $\bar{x}_b$ are in phase. This is achieved by appropriately compensating for the phase distortion produced by filter H.

Figure 4:
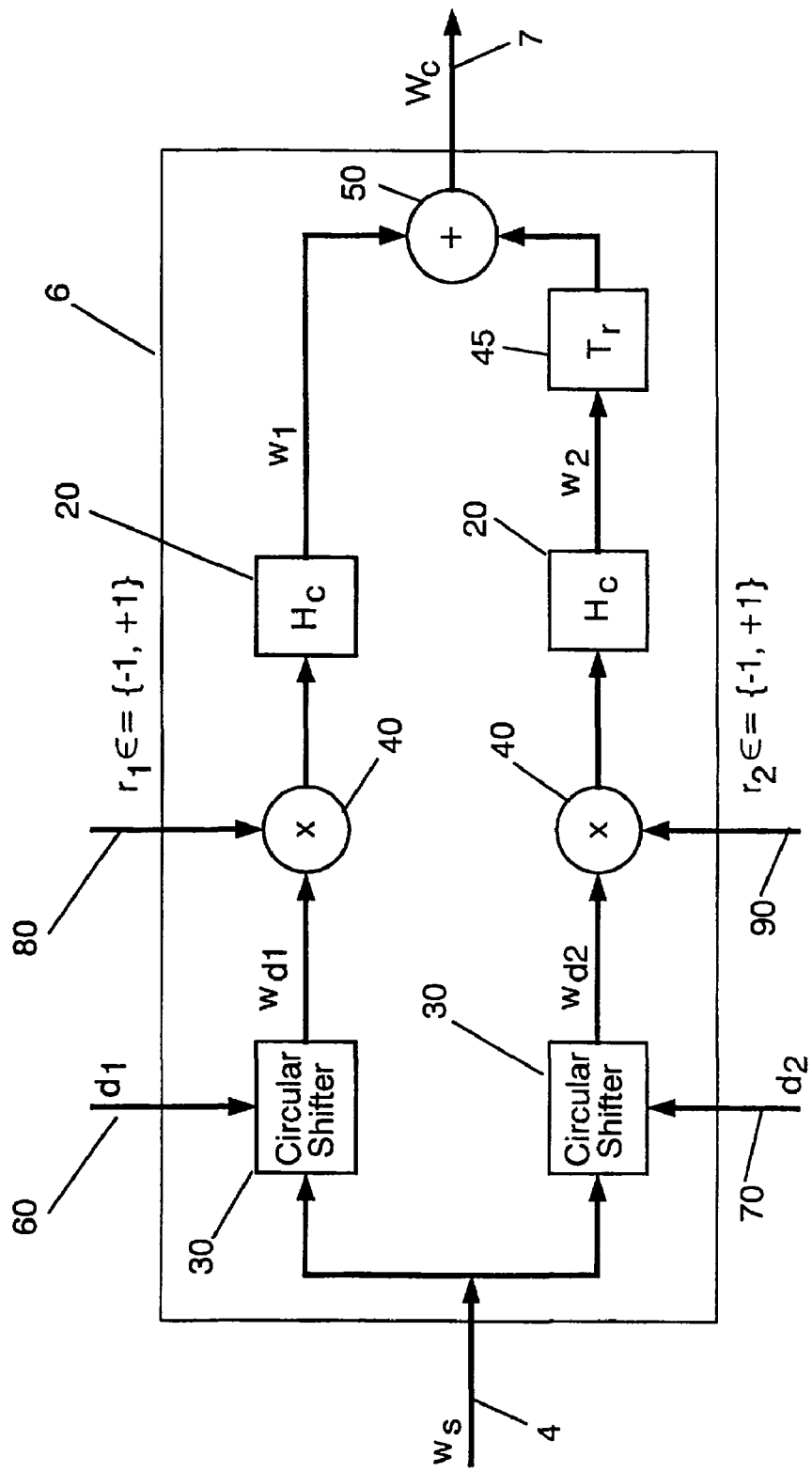
FIG. 4 shows the payload embedding and watermark conditioning stage.

In FIG. 4, the details of the payload embedder and watermark conditioning unit 6 is shown. In this unit the watermark seed signal $w_s$ is converted into a multi-bit watermark signal $w_c$.

Firstly a finite length, preferably zero mean and uniformly distributed random sequence $w_s$ is generated using a random number generator with an initial seed S. As will be appreciated later, it is preferable that this initial seed S is known to both the embedder and the detector, such that a copy of the watermark signal can be generated at the detector for comparison purposes. This results in the sequence of length $L_w$ $$w_s[k]\in[-1,1], \text{ for } k=0,1,2,\ldots,L_w-1 \quad (4)$$

Then the sequence $w_s$ is circularly shifted by the amounts $d_1$ and $d_2$ using the circularly shifting units 30 to obtain the random sequences $w_{d1}$ and $w_{d2}$ respectively. It will be appreciated that these two sequences ($w_{d1}$ and $w_{d2}$) are effectively a first sequence and a second sequence, with the second sequence being circularly shifted with respect to the first. Each sequence $w_{di}$, i=1,2, is subsequently multiplied with a respective sign bit $r_i$, in the multiplying unit 40, where $r_i$=+1 or −1, the respective values of $r_1$ and $r_2$ remaining constant, and only changing when the payload of the watermark is changed. Each sequence is then converted into a periodic, slowly varying narrow-band signal $w_i$ of length $L_w T_s$ by the watermark conditioning circuit 20 shown in FIG. 4. Finally, the slowly varying narrow-band signals $w_1$ and $w_2$ are added with a relative delay $T_r$ (where $T_r < T_s$) to give the multi-bit payload watermark signal $w_c$. This is achieved by first delaying the signal $w_2$ by the amount $T_r$ using delaying unit 45 and subsequently by adding it to $w_1$ with the adding unit 50.

Figure 5:
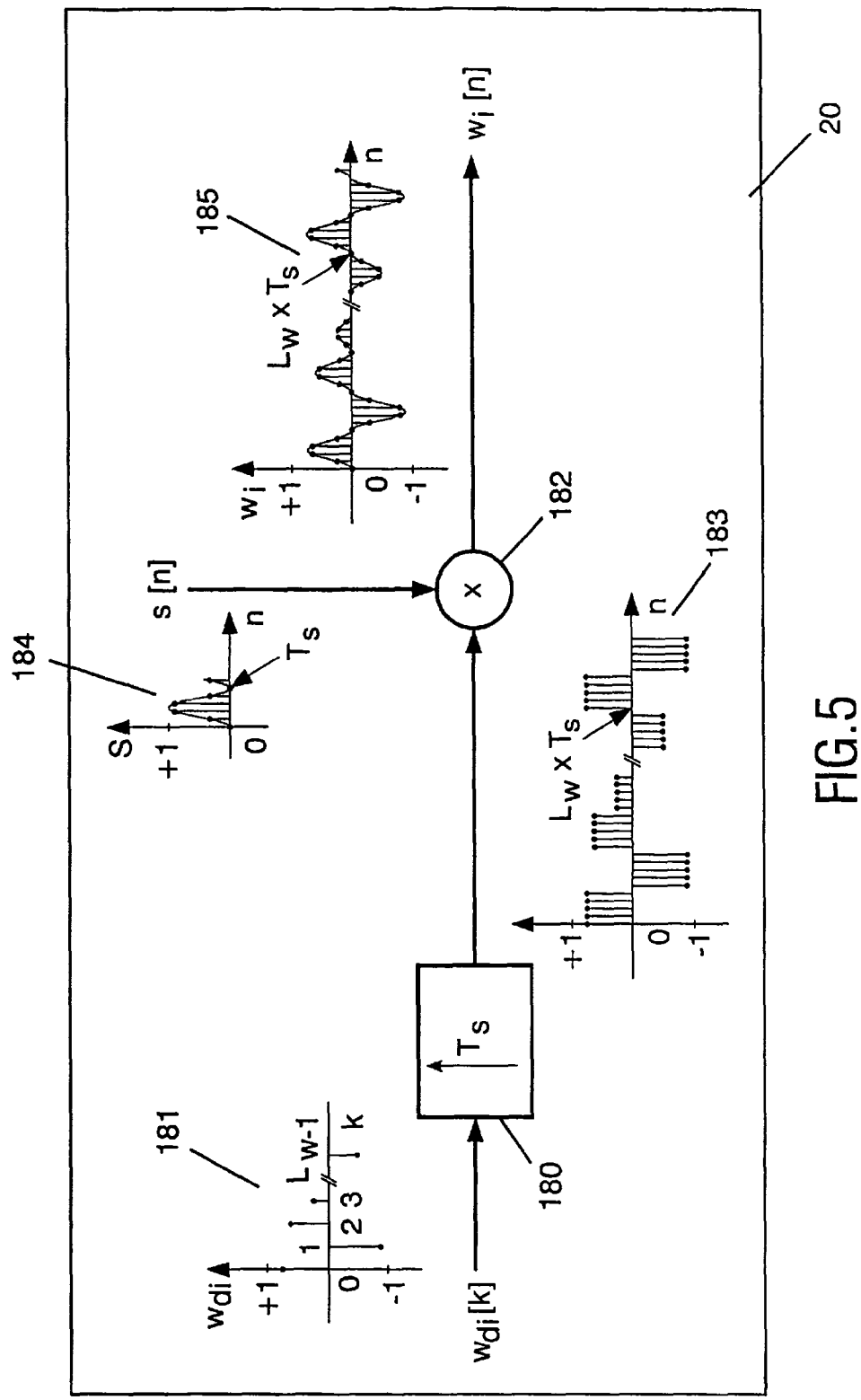
FIG. 5 is a diagram illustrating the details of the watermark conditioning apparatus $H_c$ of FIG. 4, including charts of the associated signals at each stage.

FIG. 5 shows in more detail the watermark conditioning apparatus 20 used in the payload embedder and watermark conditioning apparatus 6. The watermark random sequence $w_s$ is input to the conditioning apparatus 20.

For convenience, the modification of only one of the sequences $w_{di}$ is shown in FIG. 5, but it will be appreciated that each of the sequences is modified in a similar manner, with the results being added to obtain the watermark signal $w_c$.

As shown in FIG. 5, each watermark signal sequence $w_{di}[k]$, i=1,2 is applied to the input of a sample repeater 180. Chart 181 illustrates one of the possible sequences $w_{di}$ as a sequence of values of random numbers between +1 and −1, with the sequence being of length $L_w$. The sample repeater repeats each value within the watermark random sequence $T_s$ times, so as to generate a pulse train signal of rectangular shape. $T_s$ is referred to as the watermark symbol period and represents the span of the watermark symbol in the audio signal. Chart 183 shows the results of the signal illustrated in chart 181 once it has passed through the sample repeater 180.

A window shaping function s[n], such as a raised cosine window, is then applied to convert the rectangular pulse signals derived from $W_{d1}$ and $w_{d2}$ into slowly varying signals $w_1[n]$ and $w_2[n]$ respectively.

Chart 184 shows a typical raised cosine window shaping function, which is also of period $T_s$.

The generated signals $w_1[n]$ and $w_2[n]$ are then added up with a relative delay $T_r$ (where $T_r < T_d$ to give the multi-bit payload watermark signal $w_c[n]$ i.e.

$$w_c[n]=w_1[n]+w_2[n-T_r] \quad (5)$$

The value of $T_r$ is chosen such that the zero crossings of $w_1$ match the maximum amplitude points of $w_2$ and vice-versa. Thus, for a raised cosine window shaping function $T_r=T_s/2$, and for a bi-phase window shaping function $T_r=T_s/4$. For other window shaping functions, other values of $T_r$ are possible.

As will be appreciated by the below description, during detection the watermarked signal carrying $w_c[n]$ will generate two correlation peaks that are separated by pL (as can be seen in FIG. 11). The value pL is part of the payload, and is defined as $$pL = |d_2 - d_1| \mod\left(\left\lceil \frac{L_w}{2} \right\rceil\right) \quad (6)$$

In addition to pL, extra information can be encoded by changing the relative signs of the embedded watermarks.

In the detector, this is seen as a relative sign $r_{sign}$ between the correlation peaks. It will be seen that $r_{sign}$ can take four possible values, and may be defined as:

$$r_{sign} = \frac{2 \cdot \rho_1 + \rho_2 + 3}{2} \in \{0, 1, 2, 3\} \tag{7}$$

where $\rho_1$=sign(cL$_1$) and $\rho_2$=sign(cL$_2$) are respectively estimates of the sign bits $r_1$ (input 80) and $r_2$ (input 90) of FIG. 4, and cL$_1$ and cL$_2$ are the values of the correlation peak corresponding to $w_{d1}$ and $w_{d2}$ respectively. The overall watermark payload pL$_w$ is then given as a combination of $r_{sign}$ and pL:

$$pL_w = (r_{sign}, pL). \tag{8}$$

The maximum information ($I_{max}$), in number of bits, that can be carried by a watermark sequence of length $L_w$ is thus given by:

$$I_{max} = \log_2\left(4 \cdot \left\lceil \frac{L_w}{2} \right\rceil\right) \text{ bits} \tag{9}$$

In such a scheme, the payload is immune to relative offset between the embedder and the detector, and also to possible time scale modifications. The window shaping function has been identified as one of the main parameters that controls the robustness and audibility behavior of the present watermarking scheme. As illustrated in FIGS. 6 *a* and *b*, two examples of possible window shaping functions are herein described—a raised cosine function and a bi-phase function.

Figures 7A, 7B:
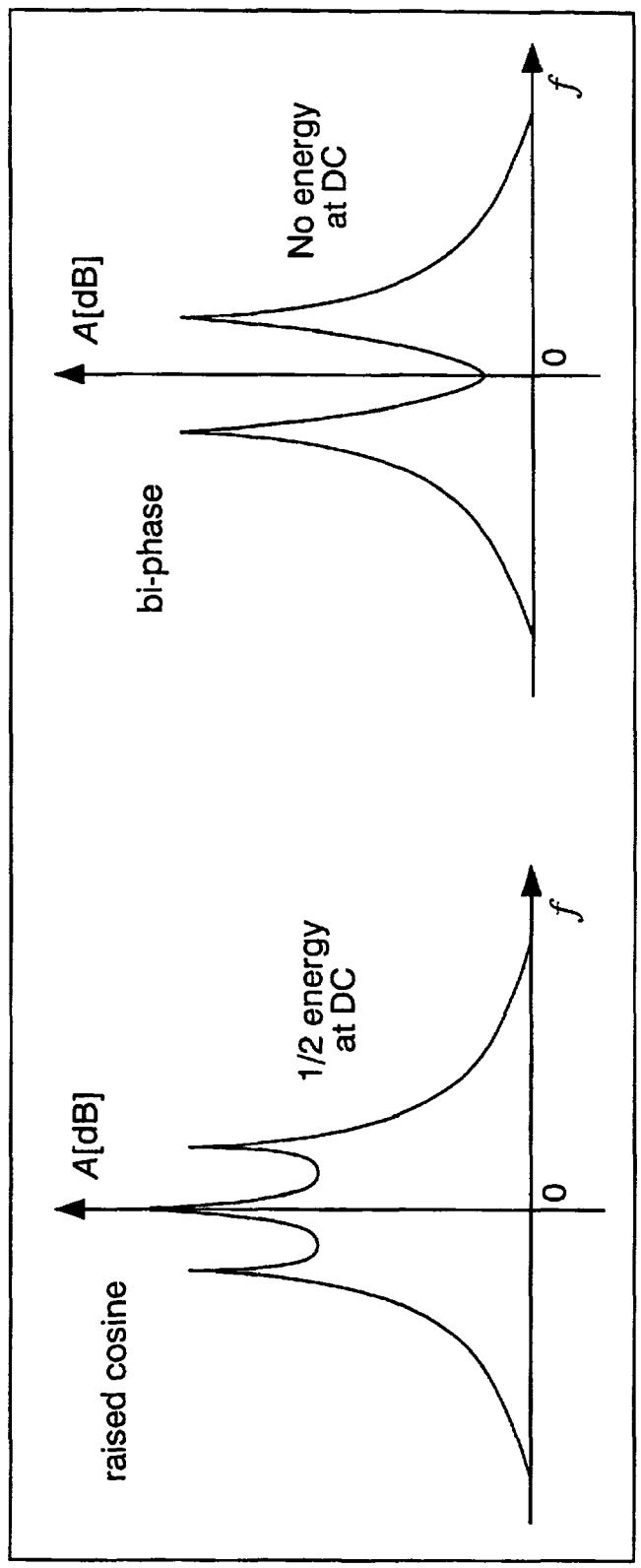
FIGS. 7a and 7b show respectively the frequency spectra for a watermark sequence conditioned with a raised cosine and a bi-phase shaping window function.

It is preferable to use a bi-phase window function instead of a raised cosine window function, so as to obtain a quasi DC-free watermark signal. This is illustrated in FIGS. 7*a* and 7*b*, which show the frequency spectra corresponding to a watermark sequence (in this case a sequence of $w_{di}[k]=\{1, 1, -1, -1, -1,\}$) conditioned with respectively a raised cosine and a bi-phase window shaping function. As can be seen, the frequency spectrum for the raised cosine conditioned watermark sequence has a maximum at frequency f=0, whilst the frequency spectrum for the bi-phase shaped watermark sequence has a minimum at f=0 i.e. it has very little DC component.

Useful information is only contained in the non-DC component of the watermark. Consequently, for the same added watermark energy, a watermark conditioned with the bi-phase window will carry more useful information than one conditioned by the raised cosine window. As a result, the bi-phase window offers superior audibility quality for the same robustness or, conversely, it allows a better robustness for the same audibility quality.

Such a bi-phase function could also be utilized as a window shaping function for other watermarking schemes. In other words, a bi-phase function could be applied to reduce the DC component of signals (such as a watermark) that are to be incorporated into another signal.

FIG. 8 shows a block diagram of a watermark detector (200, 300, 400). The detector consists of three major stages: (a) the watermark symbol extraction stage (200), (b) the buffering and interpolation stage (300), and (c) the correlation and decision stage (400).

In the symbol extraction stage (200), the received watermarked signal y'[n] is processed to generate multiple ($N_b$) estimates of the watermarked sequence, which are multiplexed into the signal $w_e[m]$. These estimates of the watermark sequence are required to resolve any time offset that may exist between the embedder and the detector, so that the watermark detector can synchronize to the watermark sequence inserted in the host signal.

In the buffering and interpolation stage (300), these estimates are de-multiplexed into $N_b$ separate buffers. An interpolation is subsequently applied to each buffer to resolve possible timescale modifications that may have occurred. For instance, a drift in sampling (clock) frequency may result in a stretch or shrink in the time domain signal (i.e. the watermark may have been stretched or shrunk).

In the correlation and decision stage (400), the content of each buffer is correlated with the reference watermark and the maximum correlation peaks are compared against a threshold to determine the likelihood of whether the watermark is indeed embedded within the received signal y'[n].

In order to maximize the accuracy of the watermark detection, the watermark detection process is typically carried out over a length of received signal y'[n] that is 3 to 4 times that of the watermark sequence length. Thus each watermark symbol to be detected can be constructed by taking the averages of several symbols. This averaging process is referred to as smoothing, and the number of times the averaging is done is referred to as the smoothing factor $s_f$. Thus, the detection window length $L_D$ is the length of the audio segment (in number of samples) over which a watermark detection truth-value is reported. Consequently, $L_D = s_f L_w T_s$, where $T_s$ is the symbol period and $L_w$ the number of symbols within the watermark sequence. Typically, the length ($L_b$) of each buffer 320 within the buffering and interpolation stage is $L_b = s_f L_w$.

In the watermark symbol extraction stage 200 shown in FIG. 8, the incoming watermark signal y'[n] is input to the signal conditioning filter $H_b$(210). This filter 210 is typically a band pass filter and has the same behavior as the corresponding filter H (15) shown in FIG. 2. The output of the filter $H_b$ is y'$_b$[n], and assuming linearity within the transmission channel, it follows from equations (2) and (3):

$$y'_b[n] \approx y_b[n] = (1 + \alpha w_c[n]) x_b[n] \tag{10}$$

Note that when no filter is used in the embedder (i.e., when H=1) then $H_b$ in the detector can also be omitted, or it can still be included to improve the detection performance. If $H_b$ is omitted, then $y_b$ in equation (10) is replaced with y. The rest of the processing is the same.

For simplification, it is assumed that there is perfect synchronism between the embedder and the detector (i.e. no offset and no change in timescale), and that the audio signal is divided into frames of length $T_s$, and that y'$_{b,m}$[n] is the n-th sample of the m-th frame of the filtered signal y'$_b$[n]. It should be noted that if there is not perfect synchronism between the embedder and the detector, then any deviation can be compensated for within the buffering and interpolation stage 300 utilizing techniques known to the skilled person e.g. iteratively searching through all possible scale and offset modifications until a best match is achieved.

The energy E[m] corresponding to the y'$_{b,m}$[n] frame is:

$$E[m] = \sum_{n=0}^{T_s-1} |y'_{b,m}[n] S[n]|^2 \tag{11}$$

where S[n] is the same window shaping function used in the watermark conditioning circuit of FIG. 5. A person skilled in the art will appreciate that equation 11 represents a matched filter receiver, and is the optimum receiver when the symbol period is perfectly synchronized. Not withstanding this fact, from now on, we set S[n]=1 in order to simplify subsequent explanations.

Combining this with equation 10, it follows that:

$$E[m] \approx \sum_{n=0}^{T_s-1} |y_{b,m}[n]|^2 = \sum_{n=0}^{T_s-1} |(1 + \alpha w_e[m])x_{b,m}[n]|^2 \quad (12)$$

where $w_e[m]$ is the m-th extracted watermark symbol. and contains $N_b$ time-multiplexed estimates of the embedded watermark sequences. Solving for $w_e[m]$ in equation 12 and ignoring higher order terms of $\alpha$, gives the following approximation:

$$w_e[m] \approx \frac{1}{2\alpha} \left( \frac{\sum_{n=0}^{T_s-1} |y_{b,m}[n]|^2}{\sum_{n=0}^{T_s-1} |x_{b,m}[n]|^2} - 1 \right) \quad (13)$$

In the watermark extraction stage 200 shown in FIG. 8, the output $y'_b[n]$ of the filter $H_b$ is provided as an input to a frame divider 220, which divides the audio signal into frames of length $T_s$ i.e. into $y'_{b,m}[n]$, with the energy calculating unit 230 then being used to calculate the energy corresponding to each of the framed signals as per equation (11). The output of this energy calculation unit 230 is then provided as an input to the whitening stage $H_w$ (240) which performs the function shown in equation 13 so as to provide an output $w_e[m]$.]. Alternative implementations (240A, 240B) of this whitening stage are illustrated in FIGS. 9 and 10.

It will be realized that the denominator of equation 13 contains a term that requires knowledge of the host signal x. As the signal x is not available to the detector, it means that in order to calculate $w_e[m]$ then the denominator of equation 13 must be estimated.

Below is described how such an estimation can be achieved for the two described window shaping functions (the raised cosine window shaping function and the bi-phase window shaping function), but it will equally be appreciated that the teaching could be extended to other window shaping functions.

In relation to the raised cosine window shaping function shown in FIG. 6a, it has been realized that the audio envelope induced by the watermark contributes predominantly to the noisy part of the energy function E[m]. The slowly varying part (i.e. the low frequency components) is predominately due to the contribution of the envelope of the original audio signal x. Thus, equation 13 may be approximated by:

$$w_e[m] \approx \frac{1}{2\alpha} \left( \frac{E[m]}{lowpass(E[m])} - 1 \right) \quad (14)$$

where "lowpass (.)" is a low pass filter function. Thus, it will be appreciated that the whitening filter $H_w$ for the raised cosine window shape in the function can be realized as shown in FIG. 9.

As can be seen, such a whitening filter $H_w$ (240A) comprises an input 242A for receiving the signal E[m]. A portion of this signal is then passed through the low pass filter 247A to produce a low pass filtered energy signal $E_{LP}[m]$, which in turn is provided as an input to the calculation stage 248A along with the function E[m]. The calculation stage 248A then divides E[m] by $E_{LP}[m]$ to calculate the extracted watermark symbol $w_e[m]$.

When a bi-phase window function is employed in the watermark conditioning stage of the embedder, a different approach should be utilized to estimate the envelope of the original audio, and hence to calculate $w_e[m]$.

It will be seen by examination of the bi-phase window function shown in FIG. 6b, that when the envelope of an audio frame is modulated with such a window function, the first and the second halves of the frame are scaled in opposite directions. In the detector, this property is utilized to estimate the envelope energy of the host signal x.

Consequently, within the detector, the audio frame is first sub-divided into two halves. The energy functions corresponding to the first and second halve frames are hence given by $$E_1[m] = \sum_{n=0}^{T_s/2-1} |y'_{b,m}[n]|^2 \text{ and} \quad (15)$$

$$E_2[m] = \sum_{n=T_s/2}^{T_s-1} |y'_{b,m}[n]|^2 \quad (16)$$

respectively. As the envelope of the original audio is modulated in opposite directions within the two sub-frames, the original audio envelope can be approximated as the mean of $E_1[m]$ and $E_2[m]$.

Further, the instantaneous modulation value can be taken as the difference between these two functions. Thus, for the bi-phase window function, the watermark $w_e[m]$ can be approximated by:

$$w_e[m] \approx \frac{1}{2\alpha} \left( \frac{E_1[m] - E_2[m]}{E_1[m] + E_2[m]} - 1 \right) \quad (17)$$

Consequently, the whitening filter $H_w$ 240B for a bi-phase window shaping function can be realized as shown in FIG. 10. Inputs 242B and 243B respectively receive the energy functions of the first and second halve frames $E_1[m]$ and $E_2[m]$. Each energy function is then split up into two, and provided to adders 245B and 246B which respectively calculate $E_1[m]-E_2[m]$, and $E_1[m]+E_2[m]$. Both of these calculated functions are then passed to the calculating unit 248B which divides the value from adder 245B by the value from 246B so as to calculate the watermark $w_e[m]$, in accordance with equation 17.

This output $w_e[m]$ is then passed to the buffering and interpolation stage 300, where the signal is de-multiplexed by a de-multiplexer 310, buffered in buffers 320 of length $L_b$ so as to resolve any lack of synchronism between the embedder and the detector, and interpolated within the interpolation unit 330 so as to compensate for any time scale modification between the embedder and the detector. Such compensation can utilize known techniques, and hence is not described in any more detail within this specification.

As shown in FIG. 8, outputs ($W_{D1}$, $W_{D2}$, ... $W_{DNb}$) from the buffering stage are passed to the interpolation stage and, after interpolation, the outputs ($w_{I1}$, $w_{I2}$, ... $W_{INb}$) of this stage, which correspond to the different estimates of the correctly re-scaled signal, are passed to the correlation and decision stage. If it is believed that no time scaling compensation is required, the values ($W_{D1}, W_{D2}, \ldots W_{DNb}$) can be passed directly to the correlation and decision stage 400 i.e. the interpolation stage 330 can be omitted from the apparatus.

The correlator 410 calculates the correlation of each estimate $w_{1j}, j=1, \ldots, N_b$ with respect to the reference watermark sequence $w_s[k]$. Each respective correlation output corresponding to each estimate is then applied to the maximum detection unit 420 which determines which two estimates provided the best fits for the circularly shifted versions $W_{d1}$ and $w_{d2}$ of the reference watermark. The correlation values (the peak amplitudes and positions) for these estimate sequences are passed to the threshold detector and payload extractor unit 430.

If the interpolation stage is omitted, alternatively the correlator 410 calculates the correlation of each estimate $w_{Dj}$, $j=1, \ldots, N_b$ with the reference watermark sequence $w_s[k]$ and the results are passed on for subsequent processing to the units 420 and 430 as outlined in the above paragraph.

The threshold detector and payload extractor unit 430 may be utilized to extract the payload (e.g. information content) from the detected watermark signal. Once the unit has estimated the two correlation peaks $cL_1$ and $cL_2$ that exceed the detection threshold, the distance pL between the peaks (as defined by equation (6)) is measured. Next, the signs $\rho_1$ and $\rho_2$ of the correlation peaks are determined, and hence $r_{sign}$ calculated from equation (7). The overall watermark payload may then be calculated using equation (8).

For instance, it can be seen in FIG. 11 that pL is the relative distance between the two peaks. Both peaks are positive i.e. $\rho_1=+1$, and $\rho_2=+1$. From equation (7), $r_{sign}=3$. Consequently, the payload $pL_w=<3, pL>$.

The reference watermark sequence w, used within the detector corresponds to (a possibly circularly shifted version of) the original watermark sequence applied to the host signal. For instance, if the watermark signal was calculated using a random number generator with seed S within the embedder, then equally the detector can calculate the same random number sequence using the same random number generation algorithm and the same initial seed so as to determine the watermark signal. Alternatively, the watermark signal originally applied in the embedder and utilized by the detector as a reference could simply be any predetermined sequence.

FIG. 11 shows a typical shape of a correlation function as output from the correlator 410. The horizontal scale shows the correlation delay (in terms of the sequence bins). The vertical scale on the left hand side (referred to as the confidence level cL) represents the value of the correlation peak normalized with respect to the standard deviation of the (typically normally distributed) correlation function.

As can be seen, the typical correlation is relatively flat with respect to cL, and centered about cL=0. However, the function contains two peaks, which are separated by pL (see equation 6) and extend upwards to cL values that are above the detection threshold when a watermark is present. When the correlation peaks are negative, the above statement applies to their absolute values.

A horizontal line (shown in the FIG. as being set at cL=8.7) represents the detection threshold. The detection threshold value controls the false alarm rate.

Two kinds of false alarms exist: the false positive rate, defined as the probability of detecting a watermark in non watermarked items, and the false negative rate, which is defined as the probability of not detecting a watermark in watermarked items. Generally, the requirement of the false positive alarm is more stringent than that of the false negative. The right hand side scale on FIG. 11 illustrates the probability of a false positive alarm p. As can be seen, in the example shown, the probability of a false positive $p=10^{-12}$ is equivalent to the threshold cL=8.7, whilst $p=10^{-83}$ is equivalent to cL=20.

After each detection interval, the detector determines whether the original watermark is present or whether it is not present, and on this basis output a "yes" or a "no" decision. If desired, to improve this decision making process, a number of detection windows may be considered. In such an instance, the false positive probability is a combination of the individual probabilities for each detection window considered, dependent upon the desired criteria. For instance, it could be determined that if the correlation function has two peaks above a threshold of cL=7 on any two out of three detection intervals, then the watermark is deemed to be present. Obviously, such detection criteria can be altered depending upon the desired use of the watermark signal and to take into account factors such as the original quality of the host signal and how badly the signal is likely to be corrupted during normal transmission.

It will be appreciated by the skilled person that various implementations not specifically described would be understood as falling within the scope of the present invention. For instance, whilst only the functionality of the embedding and detecting apparatus has been described, it will be appreciated that the apparatus could be realized as a digital circuit, an analog circuit, a computer program, or a combination thereof.

Equally, whilst the above embodiment has been described with reference to an audio signal, it will be appreciated that the present invention can be applied to other types of signal, for instance video and data signals.

Within the specification it will be appreciated that the word "comprising" does not exclude other elements or steps, that "a" or "and" does exclude a plurality, and that a single processor or other unit may fulfil the functions of several means re-cited in the claims.

The invention claimed is:

1. A method of generating a watermark signal for embedding in a multimedia signal, the method comprising:
   generating two sequences of values, the second sequence being a circularly shifted version of the first sequence; and
   generating a watermark signal by adding the values of the first sequence to the respective values in the corresponding positions of the second sequence, wherein each value of the first and second sequences is represented by a pulse of width $T_s$ so as to form rectangular wave signals.

2. The method as claimed in claim 1, wherein a window shaping function is applied to convert each of the rectangular pulse train signals into respective smoothly varying signals, with the resulting smoothly varying signals being added to form the watermark signal.

3. A method of generating a watermark signal for embedding in a multimedia signal, the method comprising:
   generating two sequences of values, the second sequence being a circularly shifted version of the first sequence; and
generating a watermark signal by adding the values of the first sequence to the respective values in the corresponding positions of the second sequence, wherein each one of said sequences of values is convolved with a window shaping function which has a width of at least $T_s$, so as to generate two smoothly varying signals, these smoothly varying signals being added together so as to form the watermark signal.

4. The method as claimed in claim 3, wherein said window shaping function has a band limited frequency behavior and a smooth temporal behavior.

5. The method as claimed in claim 4, where the window shaping function has a symmetric or anti-symmetric temporal behavior.

6. The method as claimed in claim 3, wherein said window shaping function comprises at least one of a raised cosine function and a bi-phase function.

7. The method as claimed in claim 3, wherein the watermark signal is generated by the addition of the two smoothly varying signals with a relative delay of $T_r$, where $Tr<T_s$.

8. The method as claimed in claim 7, wherein $T_r$ is chosen such that maximum amplitude points of the first smoothly varying signal coincide with zero-crossings of the second smoothly varying signal, and vice-versa.

9. The method as claimed in claim 1, wherein said watermark signal has a payload that is encoded in the combination of said two sequences of values.

10. An apparatus arranged to generate a watermark signal for embedding in a multimedia signal, the apparatus comprising: a sequence generator arranged to use a first sequence of values to generate a second sequence of values, the second sequence being a circularly shifted version of the first sequence; a signal generator arranged to generate a watermark signal by adding the values of the first sequence to the respective values in the corresponding positions of the second sequence; and a signal conditioner arranged to convert each sequence of value into a smoothly varying signal.

11. The apparatus as claimed in claim 10, wherein the apparatus is arranged to generate said first sequence of values by circularly shifting a primary sequence of values.

12. A method of embedding a watermark in a multimedia signal, the method comprising: generating a watermark signal equal to the sum of two sequences of values, the second sequence being a circularly shifted version of the first sequence of values; generating a host modifying multimedia signal as a product of the watermark signal and the multimedia signal; and generating a watermarked multimedia signal by adding a scaled version of said host modifying multimedia signal to the multimedia signal, wherein said scaled version of the host modifying signal is generated by controlling the scaling factor by a predetermined cost-function.

13. The method as claimed in claim 12, wherein said cost function comprises multiple scaling factors, each scaling factor being defined separately for one or more of the plurality of frequency bands in the multimedia signal.

14. The method as claimed in claim 13, wherein said frequency bands are determined according to a model of the human auditory and/or visual system.

15. The method as claimed in claim 12, wherein said host modifying multimedia signal is generated by multiplying said watermark signal with an extracted portion of the multimedia signal.

16. The method as claimed in claim 15, wherein said extracted portion of the multimedia signal is obtained by filtering at least a portion of the multimedia signal with respect to at least one of frequency, space and time.

17. The method as claimed in claim 12, wherein the method further comprises: generating a second watermark signal equal to the sum of a third and a fourth sequences of values, the fourth sequence being a circularly shifted version of the third sequence of values; extracting a second portion of the multimedia signal, the second portion being filtered such that it does not overlap with said first portion; generating a watermarked multimedia signal by adding the product of the second watermark signal and the second extracted portion of the multimedia signal to the watermarked multimedia signal.

18. A method of detecting a watermark signal embedded in a multimedia signal, the method: receiving a multimedia signal that may potentially be watermarked by a watermark signal modifying the temporal envelope of the host multimedia signal; applying a window shaping function to said received signal; extracting an estimate of the watermark from said received signal; and correlating the estimate of the watermark with a reference version of the watermark so as to determine whether the received signal is watermarked.

19. The method as claimed in claim 18, wherein the watermark signal has a payload, and the method further comprises determining the payload of the watermark.

* * * * *